United States Patent
Gunji et al.

(10) Patent No.: US 7,640,509 B2
(45) Date of Patent: Dec. 29, 2009

(54) PROGRAM CREATION APPARATUS, PROGRAM CREATION METHOD AND PROGRAM

(75) Inventors: Takahisa Gunji, Kanagawa (JP); Tatsuya Maeda, Kanagawa (JP)

(73) Assignee: NEC Electronics Corporation, Kanagawa (JP)

(*) Notice: Subject to any disclaimer, the term of this patent is extended or adjusted under 35 U.S.C. 154(b) by 437 days.

(21) Appl. No.: 11/446,287

(22) Filed: Jun. 5, 2006

(65) Prior Publication Data
US 2006/0290716 A1   Dec. 28, 2006

(30) Foreign Application Priority Data
Jun. 9, 2005   (JP) .................. 2005-170192

(51) Int. Cl.
G06F 3/00   (2006.01)
G06F 9/00   (2006.01)
G06F 17/00  (2006.01)

(52) U.S. Cl. .................. 715/762; 715/764; 715/763
(58) Field of Classification Search ........... 715/771, 715/760, 762, 763, 764
See application file for complete search history.

(56) References Cited

U.S. PATENT DOCUMENTS

| | | | | |
|---|---|---|---|---|
| 5,182,807 A | * | 1/1993 | Mizuse et al. ............... | 717/122 |
| 5,555,369 A | * | 9/1996 | Menendez et al. .......... | 715/762 |
| 5,706,456 A | * | 1/1998 | Dupper et al. .............. | 715/839 |
| 5,986,652 A | * | 11/1999 | Medl et al. .................. | 715/712 |
| 6,654,911 B1 | * | 11/2003 | Miles .......................... | 714/38 |
| 2001/0048433 A1 | * | 12/2001 | Rubin .......................... | 345/418 |
| 2002/0038168 A1 | * | 3/2002 | Kasuga et al. ............... | 700/245 |
| 2002/0070968 A1 | * | 6/2002 | Austin et al. ................. | 345/764 |
| 2004/0015922 A1 | * | 1/2004 | Kitakami et al. ............ | 717/154 |
| 2005/0034106 A1 | * | 2/2005 | Kornerup et al. ............ | 717/132 |
| 2005/0066280 A1 | * | 3/2005 | Austin et al. ................. | 715/733 |

FOREIGN PATENT DOCUMENTS

| | | |
|---|---|---|
| JP | 8-63345 A | 3/1996 |
| JP | 11-353164 A | 12/1999 |
| KR | 2002-97147 A | 12/2002 |
| KR | 2003-0012488 A | 2/2003 |

OTHER PUBLICATIONS

Khoral Research Inc: "The Khoros Visual Programming Environment, Chapter 1 and Appendix A", Internet Citation, Dec. 20, 1994, pp. 1-1-1-88, XP002293306,<ftp://ftp.tnt.uni-hannover.de/pub/soft/khoros2/manual/khoros_manual/>.

National Instruments: "LabVIEW User Manual—Apr. 2003 Edition", Internet Publication, Apr. 2003, pp. 1-349, XP002453188, <http://www.ni.com/pdf/manuals/320999e.pdf>.

National Instruments: "LabVIEW Application Builder User Guide", Internet Publication, Apr. 2003, pp. 1-8, XP002453189, <http://www.ni.com/pdf/manuals/323563a.pdf>.

* cited by examiner

Primary Examiner—Tadesse Hailu
Assistant Examiner—Anita D Chaudhuri
(74) Attorney, Agent, or Firm—Sughrue Mion, PLLC

(57) ABSTRACT

A program creation apparatus creates a program for a microcomputer that includes an input section, a processor and an output section. The apparatus includes a GUI display section displaying a plurality of icons, each corresponding to each operation of the input section, the processor and the output section, and a program creator creating a program according to manipulation of the icons by a user.

13 Claims, 14 Drawing Sheets

```
ANDF    MACRO   Fout,Fin1,Fin2 ;
        LOCAL   ANDFE
        CLR1    Fout
        BF      Fin1, $ANDFE
        BF      Fin2, $ANDFE
        SET1    Fout
ANDFE:
        ENDM
```

```
;;PANEL LOCATION

INPUT
I_1:SW H,P4.0    ;PORT 40
I_2:SW H,P4.1    ;PORT 41
I_3:SW H,P4.2    ;PORT 42

PROCESS
F_01:LINE LR     ;Left->Right
F_02:LINE LR     ;Left->Right
F_03:LINE LR     ;Left->Right
F_11:LINE LD     ;Left->Down
F_12:AND R       ;Right out
F_13:LINE LR     ;Left->Right
F_22:LINE LD     ;Left->Down
F_23:OR R        ;Right out
F_33:LINE LR     ;Left->Right
.
.
.
F_93:LINE LR     ;Left->Right

OUTPUT
O_3:LAMP H,P4.3  ;PORT 43
```

```
;;SORCE LIST while(1) {
  /* input */
  I_1 = SW_H(P4.0);
  I_2 = SW_H(P4.1);
  I_3 = SW_H(P4.2);

/* processing */
  F_12 = AND(I_1, I_2);
  F_23 = OR(F_12, I_3);

/* output */
  LAMP_H(P4.3, F_23);
}
```

INPUT PANEL FUNCTION TABLE

| PANEL NUMBER | MACRO | PARAMETER |
|---|---|---|
| I_1 | SW | H, P40 |
| I_2 | SW | H, P41 |
| I_3 | SW | H, P42 |
| | | |

Fig. 15A

PROCESSING PANEL FUNCTION TABLE

| INDEX | PANEL NUMBER | MACRO | PARAMETER |
|---|---|---|---|
| 1 | F_12 | AND | |
| 2 | F_23 | OR | |
| | | | |

Fig. 15B

OUTPUT PANEL FUNCTION TABLE

| PANEL NUMBER | MACRO | PARAMETER |
|---|---|---|
| O_3 | LAMP | H, P43 |
| | | |
| | | |

PROGRAM CREATION APPARATUS, PROGRAM CREATION METHOD AND PROGRAM

BACKGROUND OF THE INVENTION

1. Field of the Invention

The present invention generally relates to a program creation apparatus, a program creation method and a program, and more particularly relates to a program creation apparatus, a program creation method and a program that create a program executed on a microcomputer.

2. Description of Related Art

A microcomputer is integrated into a variety of devices and used widely as a controller for controlling the operation of each device.

The microcomputer operates according to a program stored in an internal memory to implement various control processing. Construction of a system using a microcomputer thus requires creation of software for the operation of the microcomputer. Development of microcomputer software uses programming language such as high-level language that includes C and BASIC and assembly language that is more like machine language. It is necessary to have a good knowledge of the programming language in order to create a program for a microcomputer. However, the programming languages are a set of words, numerical expression and so on that are peculiar to each language, being highly complicated. Thus, it takes much time for users to learn the language to create a program, which is much of a burden to users.

Further, a program for a microcomputer is described generally by manual input by a user, and bugs due to input errors such as spelling error and numerical expression or logic description error can occur. In order to remove the bugs, it is necessary to perform desk debugging or machine debugging using software simulator, hardware simulator and so on. The construction of a microcomputer system thus takes lots of work, which causes a deterioration in the quality of the program.

In order to overcome the above drawbacks, an apparatus that inputs a state transition diagram to create a program or an apparatus that inputs a flowchart to create a program have been proposed, for example, in Japanese Unexamined Patent Publications Nos. 08-63345 and 11-353164. However, the program creation apparatus of the related arts are based on the assumption that a user has some experience in software development, and it is unable to create software unless a user is capable of understanding the flow of software and creating a state transition diagram or a flowchart.

As described above, the program creation apparatus of the related arts require software knowledge of describing program language or understanding the flow of program operation, and it is difficult for a user without the knowledge to create a program for a microcomputer.

SUMMARY OF THE INVENTION

According to an aspect of the present invention, there is provided a program creation apparatus for creating a program for a microcomputer including an input section inputting an input signal, a processor for implementing prescribed processing on the input signal, and an output section outputting a result of the processing. The program creation apparatus includes a graphical user interface (GUI) display section displaying a plurality of GUI components, each corresponding to each operation of the input section, the processor and the output section, and a program creator creating the program according to manipulation of the plurality of GUI components by a user. The program creation apparatus enables the creation of a microcomputer program by manipulating the GUI components corresponding to the input section, the processor and the output section, thus allowing a user without knowledge of software to easily create a microcomputer program.

According to another aspect of the present invention, there is provided a program creation method of creating a program for a microcomputer including an input section inputting an input signal, a processor implementing prescribed processing on the input signal, and an output section outputting a result of the processing. The program creation method includes displaying a plurality of GUI components, each corresponding to each operation of the input section, the processor and the output section, and creating the program according to manipulation of the plurality of GUI components by a user. The program creation method enables the creation of a microcomputer program by manipulating the GUI components corresponding to the input section, the processor and the output section, thus allowing a user without knowledge of software to easily create a microcomputer program.

According to yet another aspect of the present invention, there is provided a computer program product, in a computer readable medium, including instructions executed by a computer causing the computer to implement a program creation process of creating a program for a microcomputer including an input section inputting an input signal, a processor implementing prescribed processing on the input signal, and an output section outputting a result of the processing. The program creation process includes displaying a plurality of GUI components, each corresponding to each operation of the input section, the processor and the output section, and creating the program according to manipulation of the plurality of GUI components by a user. The program product enables the creation of a microcomputer program by manipulating the GUI components corresponding to the input section, the processor and the output section, thus allowing a user without knowledge of software to easily create a microcomputer program.

The present invention provides a program creation apparatus, a program creation method and a program that allow a user without knowledge of software to easily create a program for a microcomputer.

BRIEF DESCRIPTION OF THE DRAWINGS

The above and other objects, advantages and features of the present invention will be more apparent from the following description taken in conjunction with the accompanying drawings, in which:

FIG. 12 is an example of a location file stored in a program creation apparatus according to an embodiment of the invention;

FIG. 13 is an example of a source file stored in a program creation apparatus according to an embodiment of the invention;

FIGS. 15A to 15C are examples of compilation table stored in a program creation apparatus according to an embodiment of the invention;

FIG. 16 is an example of wiring table stored in a program creation apparatus according to an embodiment of the invention.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

A program creation apparatus according to a first embodiment of the present invention is described hereinbelow. The program creation apparatus of this embodiment allows a user to input the operation of a microcomputer through manipulation of graphical user interface (GUI) and creates a program for a microcomputer according to the manipulation.

Figure 1:
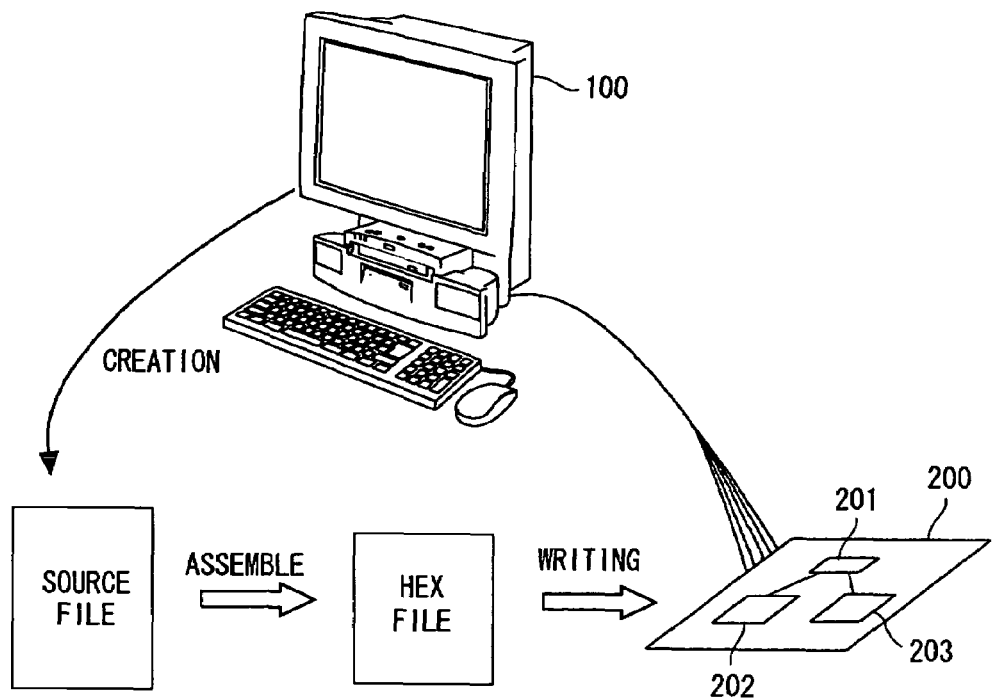
FIG. 1 is a view showing the configuration of a system including a program creation apparatus according to an embodiment of the invention.

Referring first to FIG. 1, a system that includes the program creation apparatus of this embodiment is described herein. The system includes a program creation apparatus 100 that creates a program for a microcomputer and a microcomputer board 200 where a microcomputer is mounted. The program creation apparatus 100 and the microcomputer board 200 are connected by a cable for writing. For example, if a program created in the program creation apparatus 100 is written to a microcomputer 201 on the microcomputer board 200 and the microcomputer 201 executes the program, a user can learn or evaluate the operation of the program.

The microcomputer board 200 has the microcomputer 201, a microcomputer input section 202 and a microcomputer output section 203.

The microcomputer 201 is a processor that executes a program of written HEX file and implements various processing according to the program. For example, the microcomputer 201 may be a one-chip microcomputer having a built-in flash memory, to which the program is written from the program creation apparatus 100.

The microcomputer input section 202 is connected to an input port of the microcomputer 201 and supplies an input signal to the microcomputer 201 through an input unit or the like. For example, a switch, digital signal input terminal, analog signal input terminal, serial data input terminal or other devices according to user's need may be provided in the microcomputer input section 202 and connected to the input port of the microcomputer 201. The ports that serve as an input port and an output port of the microcomputer 201 may be a fixed port number (port position) or an arbitrary port number selected by a user.

The microcomputer output section 203 is connected to an output port of the microcomputer 201 and outputs an output signal from the microcomputer 201 to outside through an output unit or the like. For example, LED (lamp), buzzer, digital signal output terminal, serial data output terminal or other devices according to user's need may be provided in the microcomputer output section 203 and connected to the output port of the microcomputer 201.

The program creation apparatus 100 creates a source file that describes the operation of the microcomputer 201 with a prescribed programming language in response to the GUI manipulation by a user. The program creation apparatus 100 assembles the created source file into a HEX file, and writes the created HEX file to the microcomputer 201. The program creation apparatus 100 may be a computer such as a personal computer or a server computer, for example.

Figure 2:
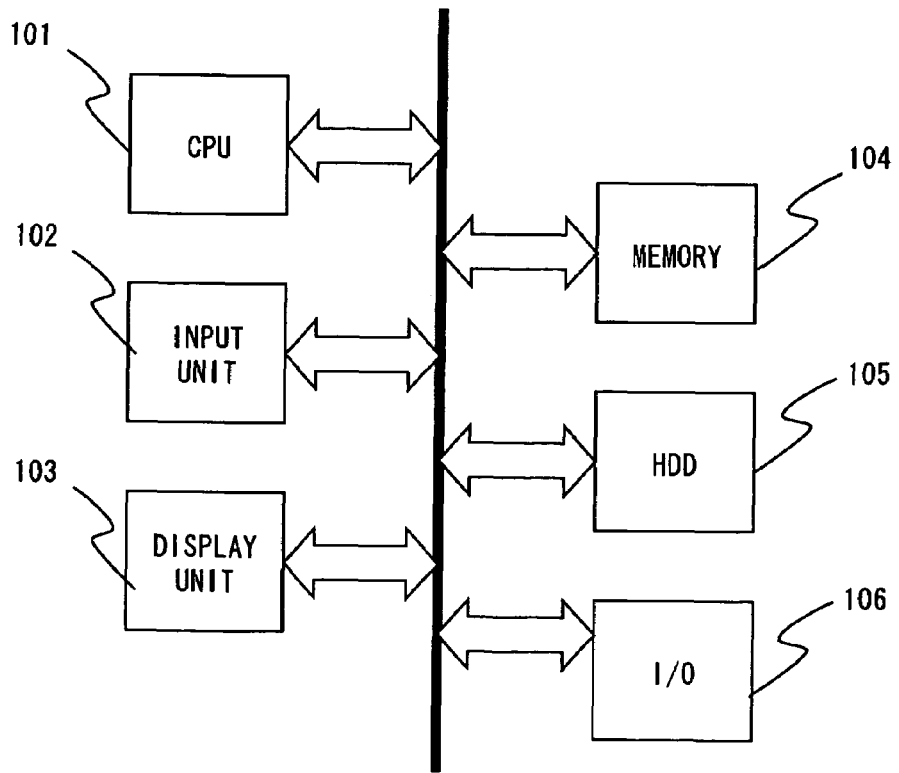
FIG. 2 is a view showing the configuration of hardware according to an embodiment of the invention.

FIG. 2 shows an example of hardware configuration for implementing the program creation apparatus 100. For example, the program creation apparatus 100 may include a central processing unit (CPU) 101 and a memory 104. The CPU 101 and the memory 104 are connected to a hard disk device (HDD) 105 that serves as an auxiliary storage through a bus. The program creation apparatus 100 typically includes user interface hardware. The user interface hardware involves, for example, an input unit 102 such as a pointing device (e.g. mouse, joy stick) and a keyboard to receive the input by a user and a display unit 103 such as CRT and a liquid crystal display to present visual data to the user. The storage medium such as the HDD 105 may store a program for supplying instruction to the CPU 101 or the like in cooperation with an operating system to implement the functions of the program creation apparatus 100. The program is executed after being loaded to the memory 104. The program creation apparatus 100 also includes an input/output interface (I/O) 106 to be connected with an external device or the like. The I/O 106 may be an adapter for microcomputer connection, for example, and connected to the microcomputer board 200. The program creation apparatus 100 is not necessarily composed of a single computer but may be composed of a plurality of computers.

Figure 3:
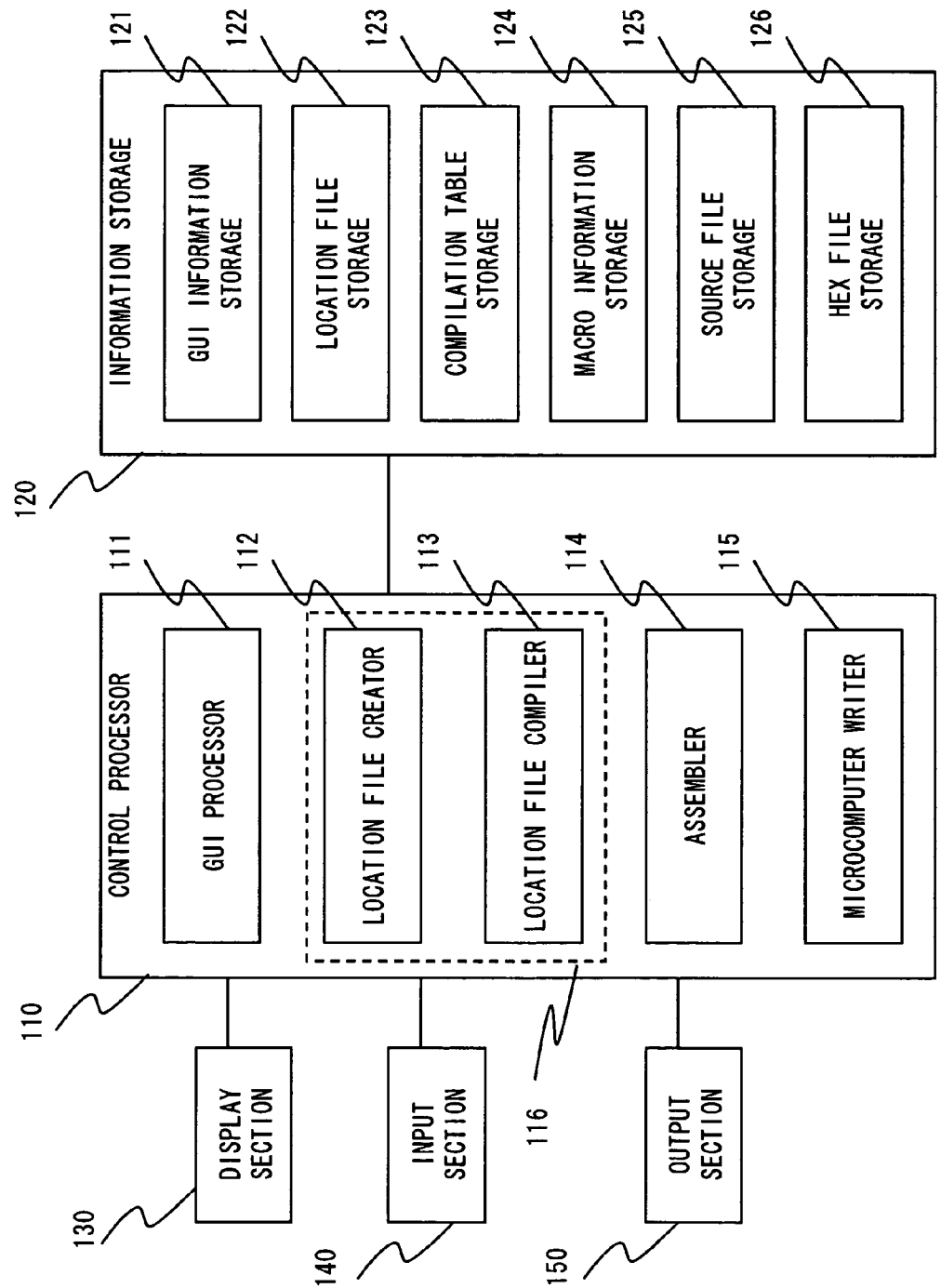
FIG. 3 is a block diagram showing the configuration of a program creation apparatus according to an embodiment of the invention.

Referring then to the block diagram of FIG. 3, the configuration of the program creation apparatus 100 according to this embodiment is described hereinafter. As shown in FIG. 3, the program creation apparatus 100 includes a control processor 110, an information storage 120, a display section 130, an input section 140 and an output section 150. The blocks in FIG. 3 are implemented by hardware shown in FIG. 2 or software executed on the hardware.

The control processor 110 executes the processing in the program creation apparatus 100. For example, the control processor 110 is a control processing unit such as CPU and executes various processing according to OS program or application program which are prestored in the information storage 120.

Specifically, the control processor 110 includes a GUI processor 111, a location file creator 112, a location file compiler 113, an assembler 114 and a microcomputer writer 115. For example, the program that describes the processing of these elements is stored in the information storage 120. The program is expanded on the memory, and the CPU executes processing according to the program and cooperates with the other hardware configuration, thereby constituting each element.

The information storage 120 includes internal storage means such as hard disk and memory and external storage means such as optical disc, and stores various data that are necessary for the processing of OS program, application program or other program. Specifically, the information storage 120 includes a GUI information storage 121, a location file storage 122, a compilation table storage 123, a macro information storage 124, a source file storage 125 and a HEX file storage 126.

The GUI information storage 121 stores GUI information for displaying GUI on the display section 130. For example, the GUI information may be image data of GUI components such as program creation window, input/output palette, processing panel and icon and are prestored in the GUI information storage 121.

The location file storage 122 stores a location file that indicates the position of the GUI component controlled by a user through GUI. For example, the location file is the position (coordinate) information of the icons and panels that are disposed on a window (editing panel).

The compilation table storage 123 stores a compilation table that is used for compiling the location file. For example, the compilation table includes wiring table and function table which are described later.

The macro information storage (instruction block storage) 124 stores macro information (instruction block) that contains prescribed processing described according to a plurality of program instructions. The macro information is prepared for each icon that indicates the microcomputer input/output and processing in the GUI information storage 121. Though the macro information is typically a macro described in assembly language, it may be another instruction block such as a function described in C language or the like.

The source file storage 125 stores a source file that is a microcomputer program that contains the description of the operation of the microcomputer. The source file is described in high-level language such as C and BASIC or assembly language, for example. Though the case where the source file is described in C language is described below, the use of the language that is suitable for the environment including a microcomputer and an assembler (e.g. compiler) for executing the program, such as assembly language, is preferred.

The HEX file storage 126 stores a HEX file that is a machine language program that is executable as it is on the microcomputer.

The GUI processor (GUI display) 111 performs the GUI displaying processing such as display and manipulation of GUI. Specifically, the GUI processor 111 receives GUI information stored in the GUI information storage 121 and displays GUI on the display section 130. As described later, the GUI processor 111 displays a plurality of icons that correspond to the operation of the microcomputer input section 202, the microcomputer (processor) 201 and the microcomputer output section 203 and the editing panel on which these icons are disposed. The GUI processor 111 also displays GUI in response to the manipulation that is input by a user through a mouse or the like in the input section 140.

The location file creator 112 and the location file compiler 113 serve as a program creator 116 that creates a program for the microcomputer according to the GUI manipulation by a user. The program creator 116 creates a program in accordance with the location file, which is the position of the icons arranged by the user. Further, the program creator 116 creates a program by using the macro that corresponds to the icons arranged by the user.

The location file creator (position information creator) 112 implements the creation of the location file that contains the position information of icons. Specifically, the location file creator 112 acquires the position of GUI displayed by the GUI processor 111 in response to the manipulation of the user, creates a location file and stores the created file into the location file storage 122.

The location file compiler 113 implements the compilation that converts the location file into the source file. Specifically, the location file compiler 113 receives the location file stored in the location file storage 122 and the macro information stored in the macro information storage 124, creates a source file and stores the created file into the source file storage 125. More specifically, the location file compiler 113 creates a compilation table based on the location file and stores the created table into the compilation table storage 123, and then creates the source file based on the compilation table and the macro information. As described later, the location file compiler 113 converts the location file into wiring table (connection information) that indicates the connection of icons and determines an input parameter of the macro based on the wiring table.

The assembler 114 implements the assembling that converts the source file into a machine language program. Specifically, the assembler 114 receives the source file stored in the source file storage 125, converts the source file into a HEX file and stores the file into the HEX file storage 126.

The microcomputer writer 115 writes the machine language program into the microcomputer 201. Specifically, the microcomputer writer 115 writes the HEX file stored in the HEX file storage 126 to the microcomputer 201 through the output section 150.

The display section 130 displays the information on the processing of the program creation apparatus 100. For example, the display section 130 receives GUI or the like from the GUI processor 111 and displays the information on the display unit such as CRT or LCD.

The input section 140 receives the information that is necessary for the processing of the program creation apparatus 100 from a user. For example, the input section 140 receives GUI manipulation from a user through the input unit such as keyboard or mouse and inputs the received information to the GUI processor 111 or the like.

The output section 150 is an interface that is connected to the microcomputer board 200. For example, the output section 150 receives the HEX file from the microcomputer writer 115 and writes the received file into the microcomputer 201 on the microcomputer board 200.

GUI information and macro information that are respectively stored in the GUI information storage 121 and the macro information storage 124 are described below. These information are prestored prior to the execution of the program creation.

Figure 4:
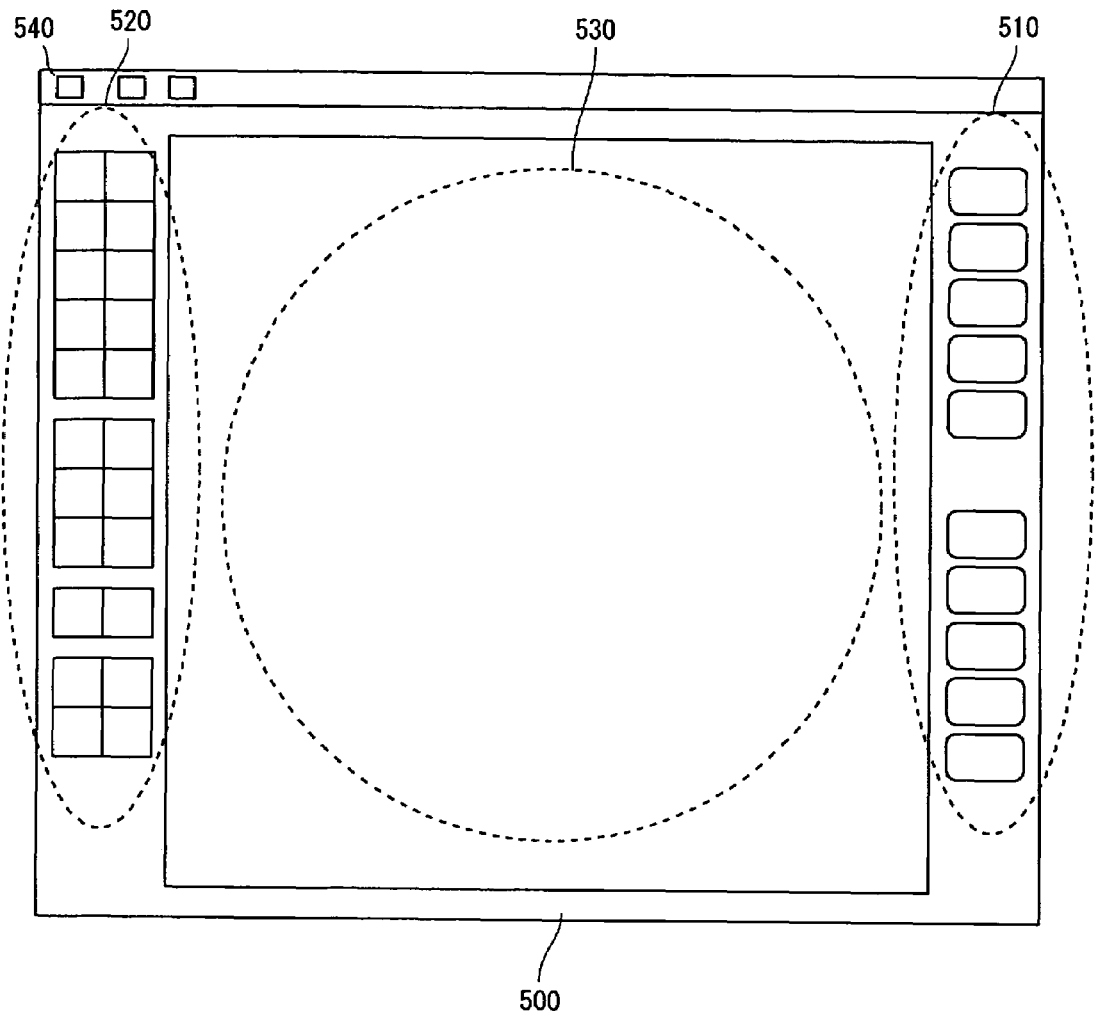
FIG. 4 is an example of a screen display in a program creation apparatus according to an embodiment of the invention.

FIGS. 4 to 8 show examples of display screens that are displayed by the GUI processor 111 according to the GUI information in the GUI information storage 121. A program creation window 500 shown in FIG. 4 is displayed by the GUI processor 111. A user manipulates an icon in the program creation window 500 to input the operation of the microcomputer or execute the processing in the program creation apparatus 100. The program creation window 500 has an input/output palette 510, a processing palette 520 and an editing panel 530 as shown in FIG. 4.

In the input/output palette 510 and the processing palette 520, predetermined icons are displayed. As described later, a simple picture that indicates a corresponding operation is displayed on each icon, so that the user can visually and easily understand the operation of the icons.

The input/output palette 510 includes a plurality of icons for setting the operation of the microcomputer input section 202 and the microcomputer output section 203. The processing palette 520 includes a plurality of icons for setting the operation of the processing to be executed on the microcomputer 201. The display positions of the input/output palette 510 and the processing palette 520 are not necessarily as shown in FIG. 4. The palettes may be in different positions that allow easy manipulation for a user. For example, they are not necessarily on both sides of the editing panel 530 but may be on the upper side or the lower side. In accordance with the configuration of the editing panel 530, it is feasible to arrange input icons and output icons of the input/output palette 510 respectively on the left side and the right side of the editing panel 530, and arrange the processing palette 520 on the lower side of the editing panel 530.

The editing panel 530 is an area that allows a user to edit the contents displayed therein. The editing panel 530 sets the input/output and a series of processing of the microcomputer 201 by using the icons of the input/output palette 510 and the processing palette 520. For example, the user drags and drops an icon of the input/output palette 510 and the processing palette 520 to arrange the icon at an arbitrary position on the editing panel 530. It is possible to change the position of the icon that has been arranged on the editing panel 530 by dragging it. It is also possible to change the setting of parameter (i.e. input/output port number, timer value and maximum count value and so on) of the icons arranged on the editing panel 530 by the manipulation such as right click.

The program creation window 500 further includes a tool bar 540. The processing of the program creation apparatus 100 can be implemented upon user's selection (click) of the icon on the tool bar 540. For example, the processing such as writing or reading of the location file, compiling, assembling and writing to the microcomputer can be executed with the use of the icon on the tool bar 540. Instead of the toolbar, it is feasible to display a menu that contains a plurality of commands for selection of a command according to each processing.

Figure 5:
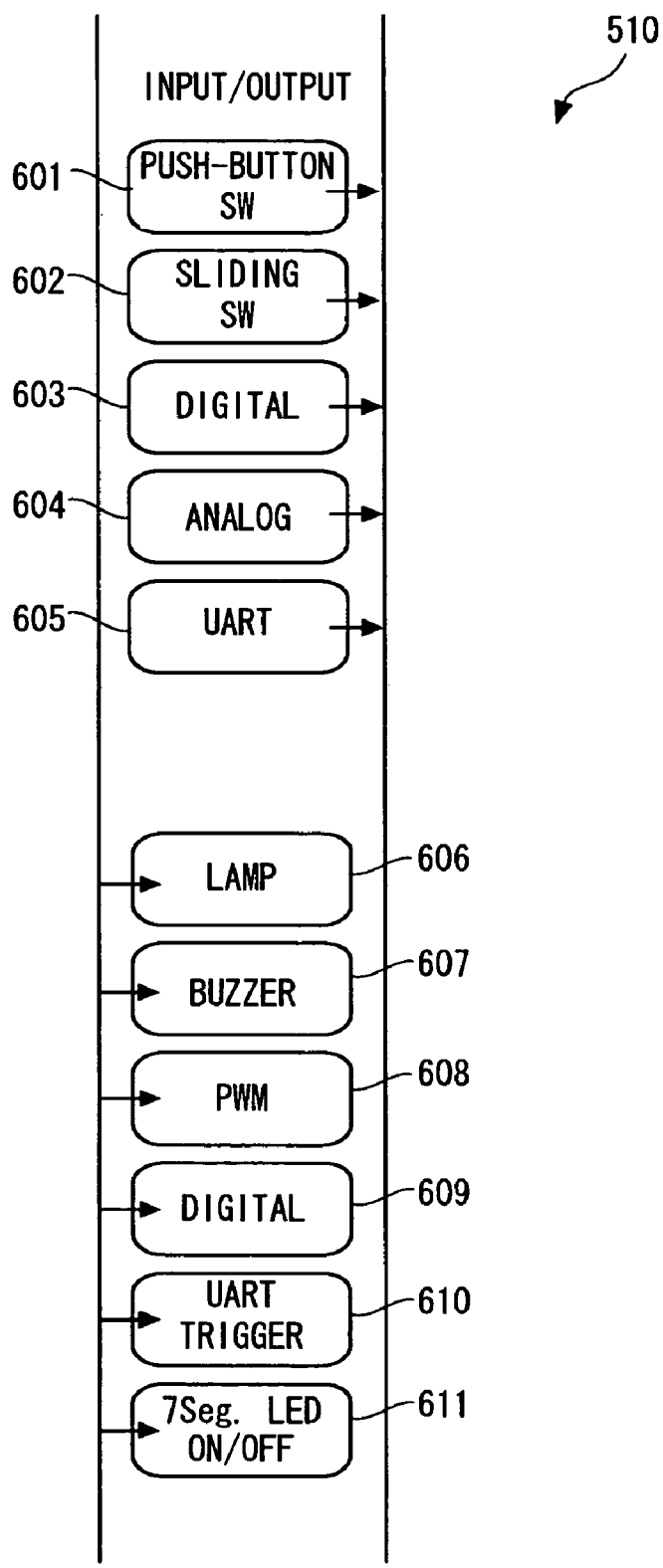
FIG. 5 is an example of a screen display in a program creation apparatus according to an embodiment of the invention.

FIG. 5 shows an example of icons displayed on the input/output palette 510. The icons 601 to 605 are for the operation setting of the microcomputer input section 202 and used to set the signal input to the input port of the microcomputer 201. For example, the icons 601 to 605 are placed correspondingly to the input units in the microcomputer input section 202.

The icon 601 is for a push-button switch, and the icon 602 is for a sliding switch. If the icons 601 and 602 are disposed on the editing panel 530, the signal corresponding to the operation of the switch on the microcomputer input section 202 is input to a prescribed input port of the microcomputer 201. The icon 603 is for digital signal input. If the icon 603 is disposed on the editing panel 530, the signal input through the digital signal input terminal of the microcomputer input section 202 is input to a prescribed input port of the microcomputer 201.

The icon 604 is for analog signal input. If the icon 604 is disposed on the editing panel 530, the signal input through the analog signal input terminal of the microcomputer input section 202 is input to a prescribed input port of the microcomputer 201 where an A/D converter is built in. The icon 605 is for UART serial data input. If the icon 605 is disposed on the editing panel 530, the serial data input through the serial data input terminal of the microcomputer input section 202 is input to a prescribed input port of the microcomputer 201.

The icons 606 to 611 are for operation setting of the microcomputer output section 203 and used to set the signal output from the output port of the microcomputer 201. For example, the icons 606 to 611 are placed correspondingly to the output units in the microcomputer output section 203.

The icon 606 is for LED (lamp) output. If the icon 606 is disposed on the editing panel 530, LED of the microcomputer output section 203 lights up in response to the output from the microcomputer 201. The icon 607 is for buzzer output. If the icon 607 is disposed on the editing panel 530, the buzzer of the microcomputer output section 203 sounds in response to the output from the microcomputer 201.

The icon 608 is for PWM signal output. If the icon 608 is disposed on the editing panel 530, the PWM signal output from the microcomputer 201 is output from the PWM signal output terminal of the microcomputer output section 203. The icon 609 is for digital signal output. If the icon 609 is disposed on the editing panel 530, the digital signal output from the microcomputer 201 is output from the digital signal output terminal of the microcomputer output section 203.

The icon 610 is for the trigger of UART serial data output. If the icon 610 is disposed on the editing panel 530, the trigger to output serial data from the microcomputer 201 is created. In response to the trigger, the serial data is output through the serial data output processing (icon 710 described later). The icon 611 is for 7-segment LED output. If the icon 611 is disposed on the editing panel 530, prescribed LED of the 7-segment LED in the microcomputer output section 203 light up to display a given number on the 7-segment LED.

Figure 6:
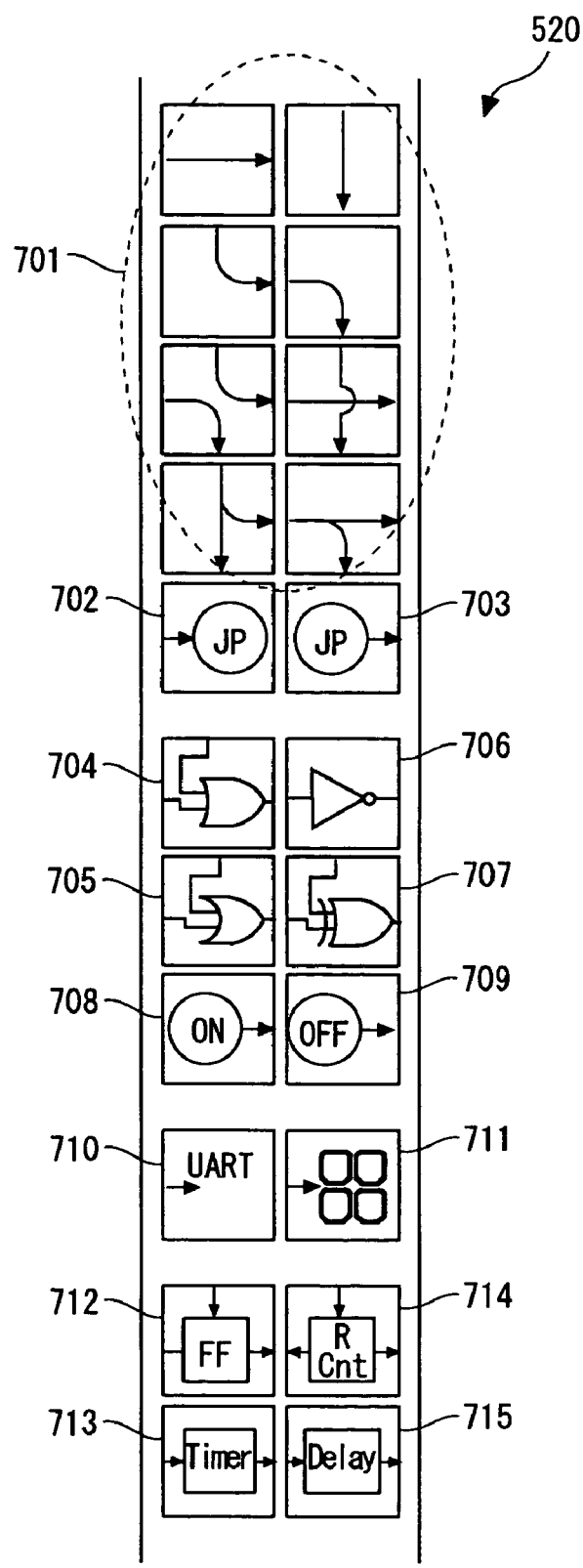
FIG. 6 is an example of a screen display in a program creation apparatus according to an embodiment of the invention.

FIG. 6 shows an example of the icons displayed on the processing palette 520. The icons 701 to 715 are for operation setting of the processing to be executed on the microcomputer. Combination of the plurality of icons enables a series of processing to be executed on the microcomputer 201. In the processing of the icons, ON/OFF digital value (binary information) is input or output.

The icon 701 is for wiring to connect the processing. If the icon 701 is disposed on the editing panel 530, the ON/OFF digital value is transmitted in the direction of the arrow of the icon. Specifically, the icon 701 outputs a digital value input from the upper side or the left side to the lower side or the right side.

The icons 702 and 703 are respectively for jumper entry and exit. If the icons 702 and 703 are disposed on the editing panel 530, ON/OFF is transmitted from the jumper entry icon 702 to the jumper exit icon 703. Specifically, the icons 702 and 703 transfer the digital value input to the jumper entry to the jumper exit that is placed away from the entry.

The icons 704 to 707 are for logical operation. If the icons 704 to 707 are disposed on the editing panel 530, AND operation, OR operation, NOT operation and XOR operation are performed on the input digital value and the operation result is output.

The icons 708 and 709 are for fixed level signal output. If the icons 708 and 709 are disposed on the editing panel 530, a constant ON or constant OFF signal is output.

The icon 710 is for UART serial data output. If the icon 710 is disposed on the editing panel 530, the input ON/OFF is directly output to the serial data output terminal of the microcomputer output section 203.

The icon 711 is for 7-segment LED output. If the icon 711 is disposed on the editing panel 530, prescribed LED of the 7-segment LED in the microcomputer output section 203 lights up directly in response to the input ON/OFF.

The icon 712 is for flip-flop processing. If the icon 712 is disposed on the editing panel 530, the operation corresponding to each type of flip-flop is performed on the input digital value, and the operation result is output. For example, the icon 712 operates similarly to RS-FF, D-FF, T-FF and so on.

The icon 713 is for timer processing. If the icon 713 is disposed on the editing panel 530, a prescribed digital value is output after a set period (timer period) of time from a time point when the input digital value changes. For example, ON is output after a set period of time has passed since the time when the input value changes from OFF to ON.

The icon 714 is for counter processing. If the icon 714 is disposed on the editing panel 530, the change in input digital value is counted, and a prescribed digital value is output when the count value reaches a preset value. For example, it counts each time the input changes from OFF to ON and outputs ON when the count value reaches a preset value. After further counted up, the count value is reset to 0.

The icon 715 is for delay processing. If the icon 715 is disposed on the editing panel 530, an input digital value is output after a set period of time from input.

Figure 7:
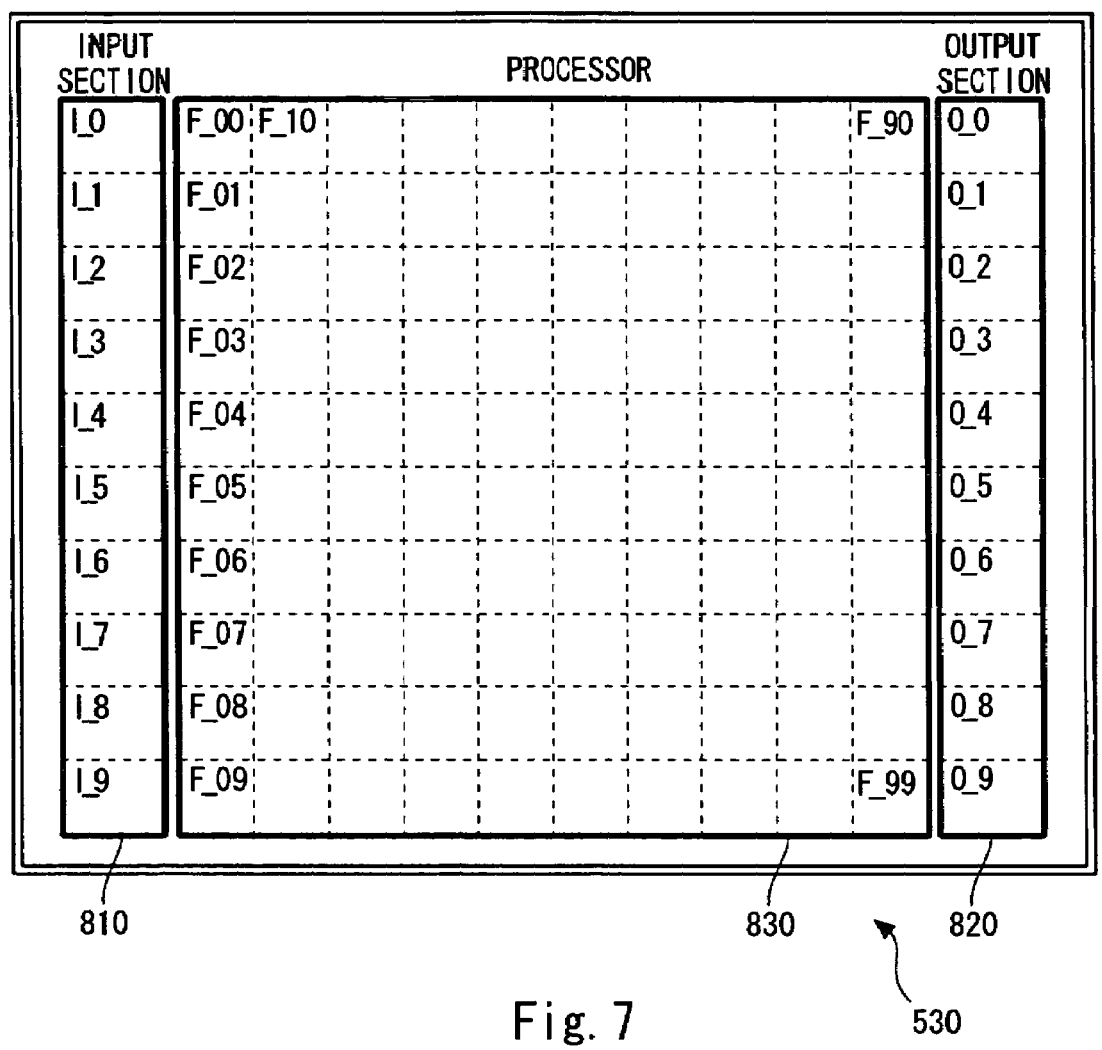
FIG. 7 is an example of a screen display in a program creation apparatus according to an embodiment of the invention.

FIG. 7 shows a display example when no icon is disposed on the editing panel 530. The editing panel 530 has an input panel 810, an output panel 820 and a processing panel 830. The input panel 810, output panel 820 and processing panel 830 are respectively divided into a plurality of panels, each for icon placement. I_0, O_0, F_00 are panel numbers that indicate the position of each panel. The number of panels are not necessarily as shown in FIG. 7 but may be any arbitrary number.

The input panel 810 includes 10 panels from I_0 to I_9 that are aligned in one direction. The icons for input operation setting (icons 601 to 605) of the input/output palette 510 may be disposed on the input panel 810.

The output panel 820 includes 10 panels from O_0 to O_9 that are aligned in one direction. The icons for output operation setting (icons 606 to 611) of the input/output palette 510 may be disposed on the output panel 820.

The processing panel 830 includes 100 panels from F_00 to F_99 that are arranged two-dimensionally in a lattice pattern. The first digit of the number of the panel indicates a row number and the second digit indicates a column number. The icons for processing operation setting (icons 701 to 715) of the processing palette 520 may be disposed on the processing panel 830.

In this example, the input panel 810 is placed on one side (left side) of the processing panel 830 and the output panel 820 is placed on the other side (right side) of the processing panel 830. This arrangement allows the user to easily keep track of a series of operation from the input of an input signal to the input section, transmission through the processing section and the output of the signal from the output section.

Figures 8, 9:
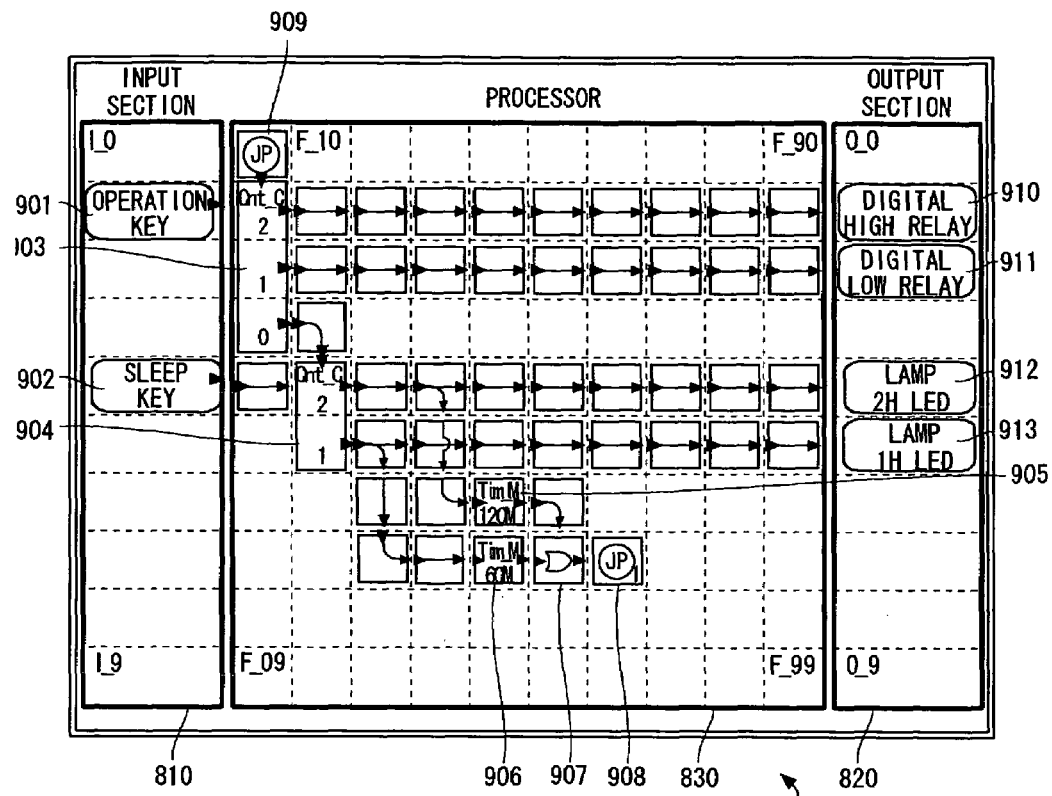
FIG. 8 is an example of a screen display in a program creation apparatus according to an embodiment of the invention.
FIG. 9 is an example of macro stored in a program creation apparatus according to an embodiment of the invention.

FIG. 8 shows a specific display example where icons are disposed on the editing panel 530. FIG. 8 illustrates an example of processing for the control of a fan. In this example, the microcomputer 201 implements processing in accordance with pressing of an operation key or a sleep key that are placed in the microcomputer input section 202 so as to activate the fan or turn on the LED by a digital relay that is placed in the microcomputer output section 203.

The operation when the icons are arranged as shown in FIG. 8 is described below. Each time pressing an operation key 901 that is disposed on I_1 of the input panel 810, the count value of a counter 903 that is disposed on F_01 to F_03 of the processing panel 830 switches among 2, 1 and 0. Though the counter 903 and a counter 904 are down counters that decrement a count value in this example, they may be up counters that increment a count value.

If the count value of the counter 903 is 2, ON is supplied to a digital HIGH relay 910 that is disposed on O_1 of the output panel 820. The digital HIGH relay 910 is such that a high output relay is connected to the digital signal output terminal, so that the fan operates with a large volume of air.

If the count value of the counter 903 is 1, ON is supplied to a digital LOW relay 911 that is disposed on O_2 of the output panel 820. The digital LOW relay 911 is such that a low output relay is connected to the digital signal output terminal, so that the fan operates with a small volume of air.

If the count value of the counter 903 is 0, OFF is supplied to the digital HIGH relay 910 and the digital LOW relay 911, so that the fan stops operating. Further, ON is supplied to the counter 904 to reset the count value of the counter 904 and stop the timer operation.

Each time pressing a sleep key 902 that is disposed on I_4 of the input panel 810, the count value of the counter 904 that is disposed on F_14 to F_15 of the processing panel 830 switches between 2 and 1.

If the count value of the counter 904 is 2, ON is supplied to a 2H-LED lamp 912 that is disposed on O_4 of the output panel 820 and thereby the LED lights up. Further, ON is supplied to a 120M-timer 905. The 120M-timer 905 then transmits ON to the counter 903 through the OR 907, the jumper 908 and the jumper 909 after 120 minutes from the input of ON, thereby resetting the count value of the counter 903. Accordingly, the operation of the fan stops after 120 minutes since the sleep key 902 is pressed.

If the count value of the counter 904 is 1, ON is supplied to a 1H-LED lamp 913 that is disposed on O_5 of the output panel 820 and thereby the LED lights up. Further, ON is supplied to a 60M-timer 906. The 60M-timer 906 then transmits ON to the counter 903 through the OR 907, the jumper 908 and the jumper 909 after 60 minutes from the input of ON, thereby resetting the count value of the counter 903. Accordingly, the operation of the fan stops after 60 minutes since the sleep key 902 is pressed.

It is thus possible to set the operation of switching the volume of air of the fan among high, low and off each time pressing the operation key and switching the operation of the fan among sleep-on (2 hours), sleep-on (1 hour) and sleep-off each time pressing the sleep key easily by arranging the icons as shown in FIG. 8.

FIG. 9 shows an example of macro information that is stored in the macro information storage 124. FIG. 9 is an example of definition of ANDF macro that is described in assembly language, just like the source file. For example, if a macro name ANDF and parameters Fout, Fin1 and Fin2 are described in a main program, a plurality of instructions in the macro of FIG. 9 are performed during the execution of the program. In this example, input of a value to Fin1 and Fin2 of ANDF macro gives Fout a result of AND operation of Fin1 and Fin 2. In this embodiment, the macros that respectively correspond to the input section icon and the output section icon of the input/output palette 510 and the processing icons of the processing palette 520 are prepared and stored in the macro information storage 124. Therefore, a program can be created by simply describing the macro corresponding to each icon on the main program, thus enabling efficient and accurate program creation.

Referring now to the flowchart of FIG. 10, a program creation process according to this embodiment is described hereinafter. The program creation process is implemented by the control processor 110 of the program creation apparatus 100.

For a start, the GUI processor 111 displays GUI (S101). If a user starts up a program for program creation on a computer, for example, the GUI processor 111 reads GUI information from the GUI information storage 121 and displays the program creation window 500 shown in FIG. 4. At this time, the editing panel 530 of the program creation window 500 may be an initial state where no icon is disposed. Alternatively, the editing panel 530 may have given icons prearranged. For example, the icons that correspond to the devices placed in the microcomputer input section 202 and the microcomputer output section 203 may be disposed respectively on the input panel 810 and the output panel 820 of the editing panel 530. This prevents configuration errors of the input section or the output section.

Then, the user manipulates GUI to edit the editing panel 530 (S102). For example, if the user drag and drops an icon on the program creation window 500, the GUI processor 111 disposes the selected icon on the editing panel 530 in response to the user manipulation.

Figure 11:
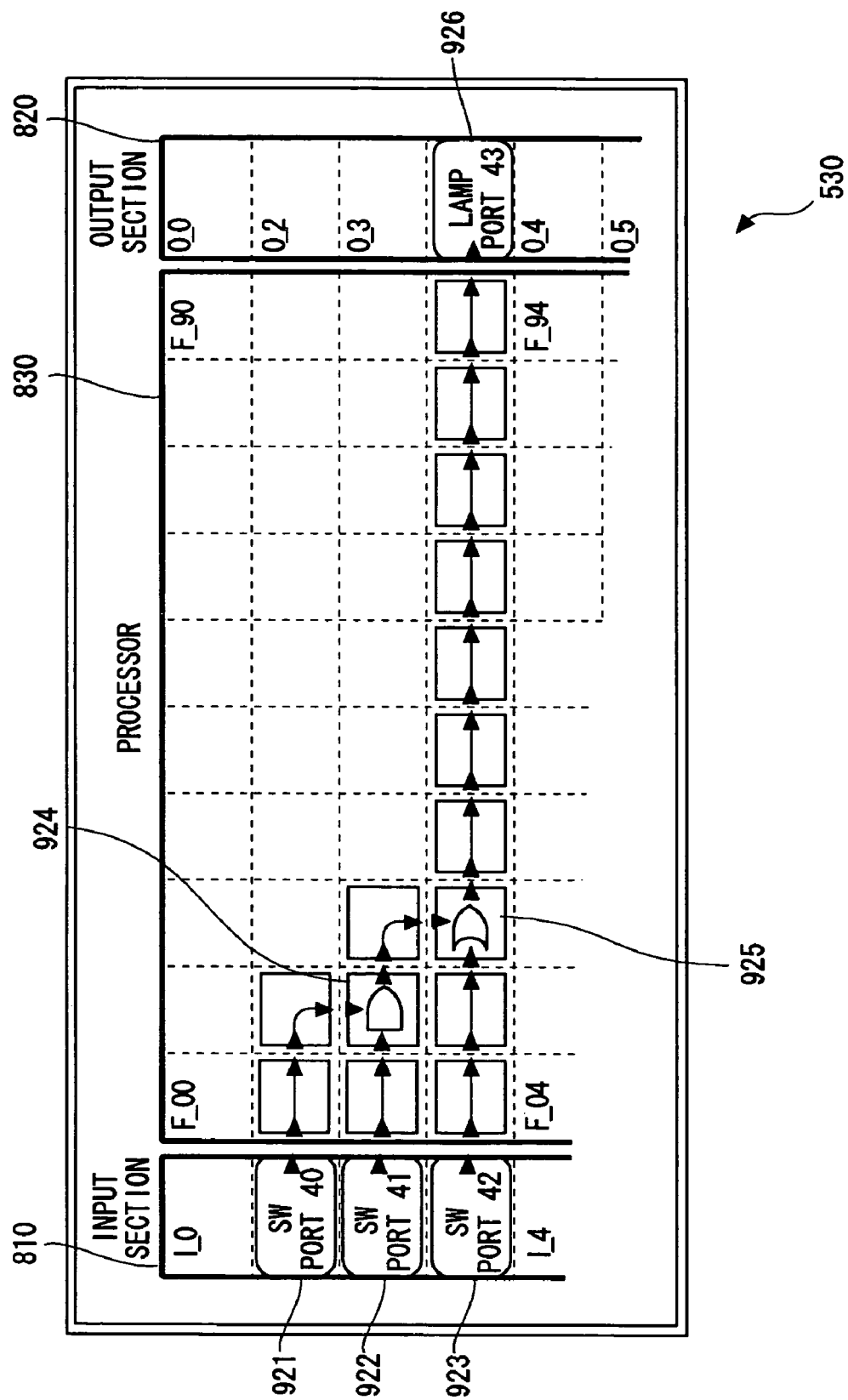
FIG. 11 is an example of a screen display in a program creation apparatus according to an embodiment of the invention.

FIG. 11 shows an example where the user arranges the icons on the editing panel 530. In the input panel 810, switches 921, 922 and 923 are disposed on I_1, I_2 and I_3, respectively. In the output panel 820, a lamp 926 is disposed on O_3. In the processing panel 830, AND 924 is disposed on F_12, OR 925 is disposed on F_23 and icons for wiring are disposed to make a connection of the switches 921, 922, 923, the AND 924, the OR 925 and the lamp 926. If this processing is executed on the microcomputer, the lamp lights up when pressing both of the switches 921 and 922 or when pressing the switch 923.

Then, the location file creator 112 creates a location file (S103). For example, if the user clicks a prescribed icon on the tool bar 540 of the program creation window 500, the location file creator 112 creates a location file according to the position of the icons arranged on the editing panel 530 that is edited by the user in S102 and stores the file into the location file storage 122.

FIG. 12 is an example of the location file that is created in S103, which is a result of converting the editing panel 530 shown in FIG. 11 into the location file. A part indicated by "A" in FIG. 12 contains the information that is converted from the input panel 810, a part "B" contains the information converted from the processing panel 830, and a part "C" contains the information converted from the output panel 820.

If I_0 to I_9 in the input panel 810 are selected sequentially and the icons are arranged on the panel, the information of the panel is described on the location file. Similarly, F_00 to F_99 in the processing panel 830 are selected sequentially, O_0 to O_9 in the input panel 820 are selected sequentially, and the information of the panel on which the icons are arranged is described on the location file.

Each panel of the input panel 810 and the output panel 820 is converted into a panel number on which an icon is disposed, a macro name which corresponds to the icon, and a parameter of the macro which is set to the macro. For example, in the part A of FIG. 12, the switch 921 of the input panel 810 is converted into the panel number "I_1", the macro name "SW" and the parameter "H, P4.0". In the part C of FIG. 12, the switch 926 of the output panel 820 is converted into the panel number "O_3", the macro name "LAMP" and the parameter "H, P4.3"

Each panel of the processing panel 830 is converted into a panel number on which an icon is disposed, a macro name which corresponds to the icon, and input/output information of the panel. For example, in the part B of FIG. 12, the wiring icon of F_01 is converted into the panel number "F_01", the macro name "LINE" and the input/output information "LR". The AND 924 is converted into the panel number "F_12", the macro name "AND" and the input/output information "R". The OR 925 is converted into the panel number "F_23", the macro name "OR" and the input/output information "R".

Then, the source file is created in Steps S104 and S105. If a user clicks a prescribed icon that is placed in the tool bar 540 of the program creation window 500, for example, the processing of S104 and S105 is executed to thereby create a source file.

When creating the source file, the location file compiler 113 first executes the compilation table creation (S104). As described later, the location file compiler 113 creates a compilation table such as function table and wiring table based on the location file created in S103.

Then, the location file compiler 113 executes source file creation (S105). As described later, the location file compiler 113 creates a source file based on the compilation table created in S104 and stores the file into the source file storage 125.

FIG. 13 is an example of the source file that is created in S105, which is a result of converting the location file shown in FIG. 12 into the source file. In this example, the source file of FIG. 13 is descried in C language.

A part indicated by "A" in FIG. 13 contains a program of a microcomputer input section that is converted from the part corresponding to the input panel 810 in the location file. A part "B" contains a program of a microcomputer processor converted from the part corresponding to the processing panel 830 in the location file. A part "C is a program of a microcomputer output section converted from the part corresponding to the output panel 820 in the location file.

For example, in the part A of FIG. 13, the outputs of SW macro of the input ports 40 to 42 of the microcomputer are assigned to variables I_1 to I_3. In the part B of FIG. 13, the outputs of the AND macro when receiving inputs I_1 and I_2 are assigned to F_12, and the outputs of the OR macro when receiving the inputs F_12 and I_3 are assigned to F_23. In the part C of FIG. 13, output is routed through LAMP macro of the output port 43 when receiving input F_23. Consequently, a program that makes the lamp of the port 43 light up when pressing both of the switch of the port 40 and the switch of the port 41 or when pressing the switch of the port 42 is created just like the image of the arrangement as shown in FIG. 11.

After that, the assembler 114 assembles the source file to create a HEX file (S106). For example, if the user clicks a prescribed icon that is placed on the tool bar 540 of the program creation window 500, the assembler 114 reads the source file created in S105 from the source file storage 125, assembles the retrieved source file into a HEX file and stores the created HEX file into the HEX file storage 126.

Then, the microcomputer writer 115 writes the HEX file to the microcomputer (S107). For example, if a user clicks a prescribed icon that is placed on the tool bar 540 of the program creation window 500, the microcomputer writer 115 reads the HEX file created in S106 from the HEX file storage 126 and writes the file to the microcomputer.

Figure 10:
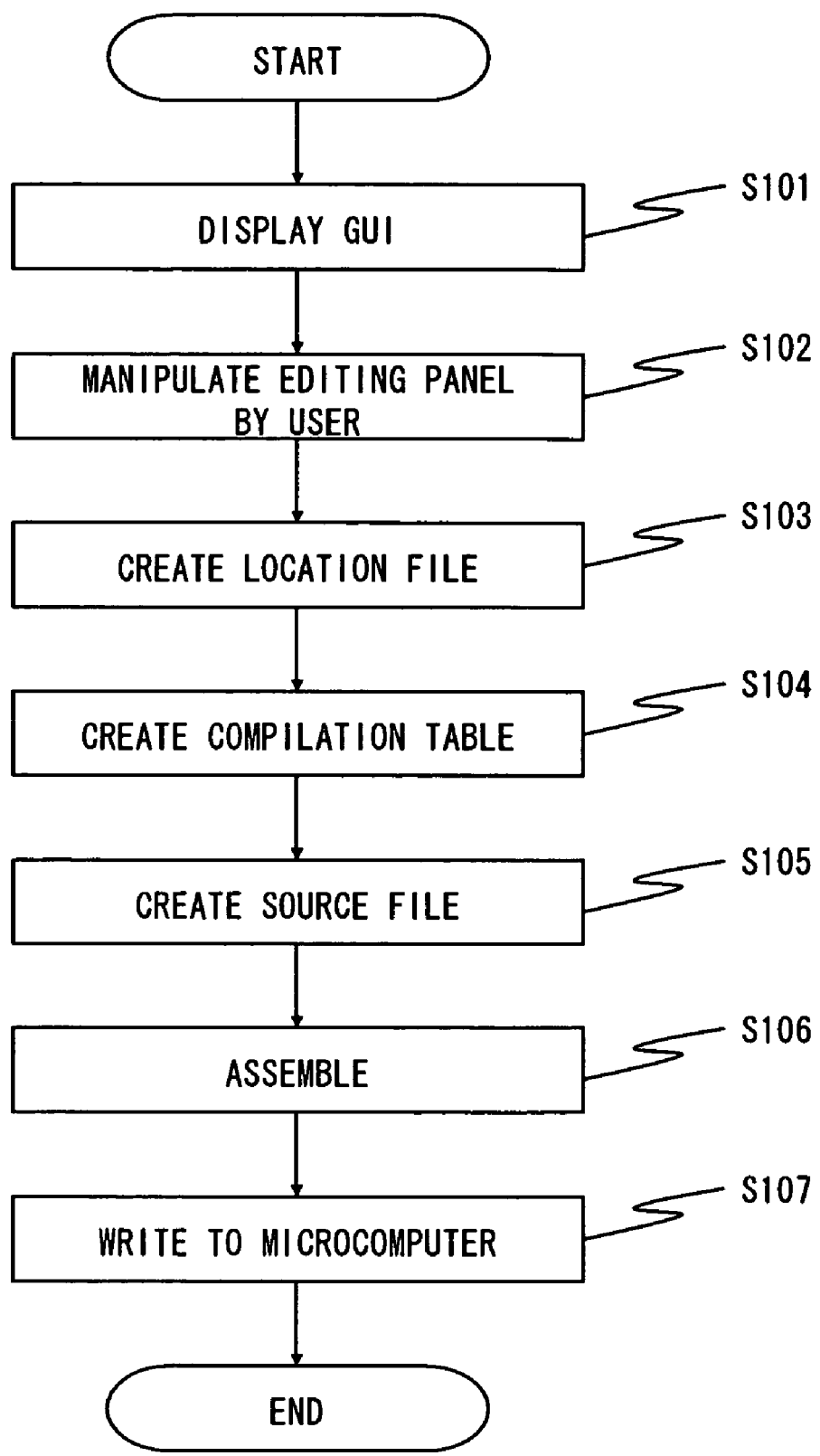
FIG. 10 is a flowchart showing the operation of a program creation apparatus according to an embodiment of the invention.
Figure 14:
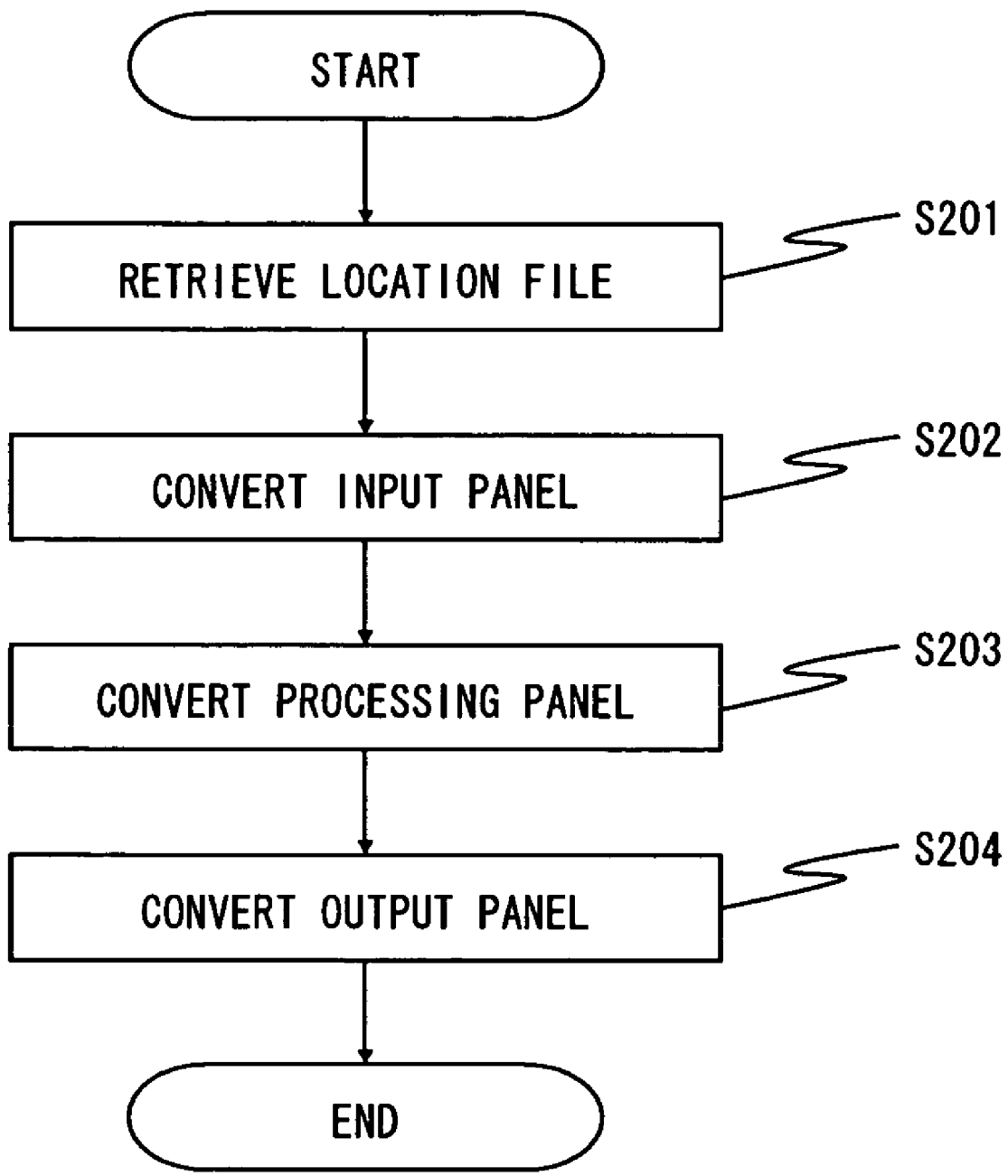
FIG. 14 is a flowchart showing the operation of a program creation apparatus according to an embodiment of the invention.

Referring then to the flowchart of FIG. 14, the compilation table creation process which is performed in S104 of FIG. 10 is described hereinbelow. The compilation table creation is implemented by the location file compiler 113 as described above.

First, the location file compiler 113 reads the location file (S201). For example, the location file compiler 113 reads the location file from the location file storage 122 after the location file creator 112 creates the location file.

Then, the location file compiler 113 creates a location file in S 202 to S204. Specifically, the location file compiler 113 converts the part corresponding to the input panel 810 of the location file (S202). For example, the location file compiler 113 refers to the part corresponding to the input panel of the location file read out in S201 and creates an input panel function table. The input panel function table contains the macro that corresponds to the icons disposed on the input panel 810.

FIG. 15A shows an example of the input panel function table that is created in S202. This table is created based on the location file shown in FIG. 12. The input panel function table can contain a plurality of data sets (row data sets) in units of row or icon (macro), each row set containing a panel number, macro and parameter. Each row data set is created for each row of the location file in the order of rows of the location file, which is the order of the panel numbers.

For example, "I_1: SW H, P4.0" in the location file of FIG. 12 is stored in the input panel function table as the panel number "I_1", the macro name "SW" and the parameter "H, P4.0".

Then, the location file compiler 113 converts the part corresponding to the processing panel of the location file (S203). For example, the location file compiler 113 refers to the part corresponding to the processing panel of the location file read out in S201 and creates wiring table and processing panel function table. The wiring table contains information that indicates the connection of the icons disposed on the processing panel 830. The processing panel function table contains the macro that corresponds to the icons disposed on the processing panel 830.

Figure 16:
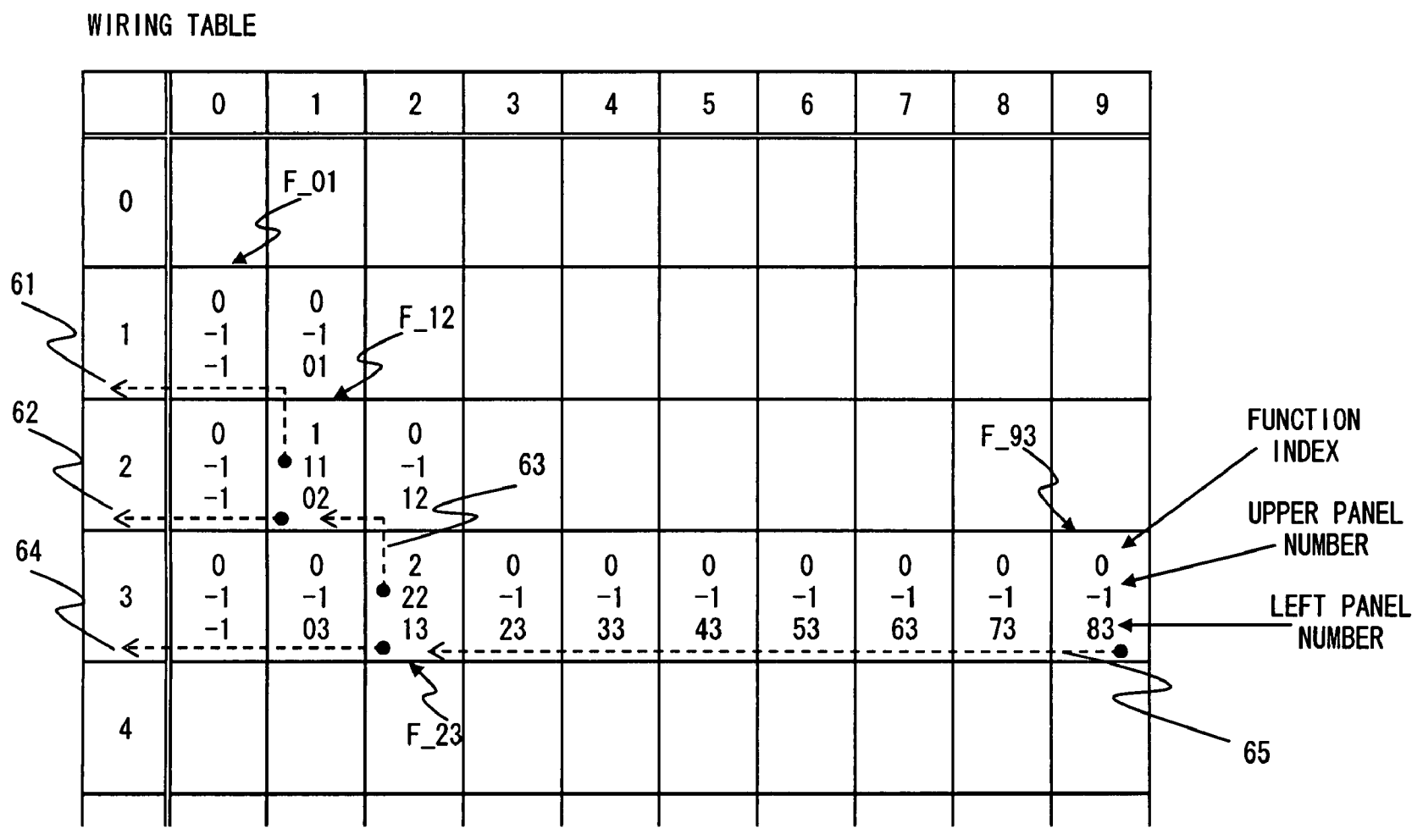

FIG. 16 shows an example of the wiring table that is created in S203. FIG. 15B shows an example of the processing panel function table that is created also in S203. These tables are created based on the location file shown in FIG. 12.

The wiring table is configured in a two-dimensional array correspondingly to the rows and columns of the processing panel. Each array data set contains a function index, an upper panel number and a left panel number. The function index is an index of the processing panel function table. For example, the function index of "0" indicates an icon of wiring or the like that implements no processing. The upper panel number is a number of the panel that is connected to the upper side, and the left panel number is a number of the panel that is connected to the left side. For example, the upper or the left panel number of "−1" indicates that there is no panel that is connected adjacent to the upper side or the left side.

The processing panel function table can also contain a plurality of row data sets just like the input panel function table. Each row set contains a panel number, macro, parameter, and further index in the order of data creation. Each row data set is created for each processing of the processing panel.

The wiring table and the processing panel function table are created in the order of the description of the location file, which is the order of the panel number. In the example of the location file shown in FIG. 12, F_01 to F_03 is processed first, F_11 to F_13 is next, then F_22 to F_23 and finally F_33 to F_93, thereby creating the wiring table and the processing panel function table.

For example, "F_01:LINE LR" in the location file indicates wiring and thus no processing executed, so that the function index is "0", indicates no panel connected to the upper side, so that the upper panel number is "−1", and indicates no panel connected to the left side, so that the left panel number is "−1". On the other hand, "F_12:AND R" in the location file indicates the operation of AND operation. In this case, data is stored in both of the processing panel function table and the wiring table. First, the index "1", panel number "F_12" and macro name "AND" are stored in the processing panel function table. Since the input of macro is not determined, no parameter is set. Then, the same function index "1" as in the processing panel function table, the upper panel number "11" due to the presence of the panel connected to the upper side, and the left panel number "02" due to the presence of the panel connected to the left side are stored in the wiring table.

"F_23:OR R" in the location file indicates the operation of OR operation. The index "2", panel number "F_23" and macro name "OR" are stored in the processing panel function table. In the wiring table, the function index "2", the upper panel number "22" due to the presence of the panel connected to the upper side, and the left panel number "13" due to the presence of the panel connected to the left side are stored.

After that, the location file compiler 113 converts the part corresponding to the output panel in the location file (S204). For example, the location file compiler 113 refers to the part corresponding to the output panel of the location file that is read out in S201 and creates an output panel function table. The output panel function table contains the macro that corresponds to the icons disposed on the output panel 830.

FIG. 15C shows an example of the output panel function table that is created in S204. This table is created based on the location file shown in FIG. 12. The output panel function table can also contain a plurality of row data sets that are created in the order of the row of the location file as is the case with the input panel function table. Each row set contains a panel number, macro and parameter.

For example, "O_3:LAMP H, P4.3" in the location file of FIG. 12 is stored in the output panel function table as the panel number "O_3", the macro name "LAMP" and the parameter "H, P4.3".

Figure 17:
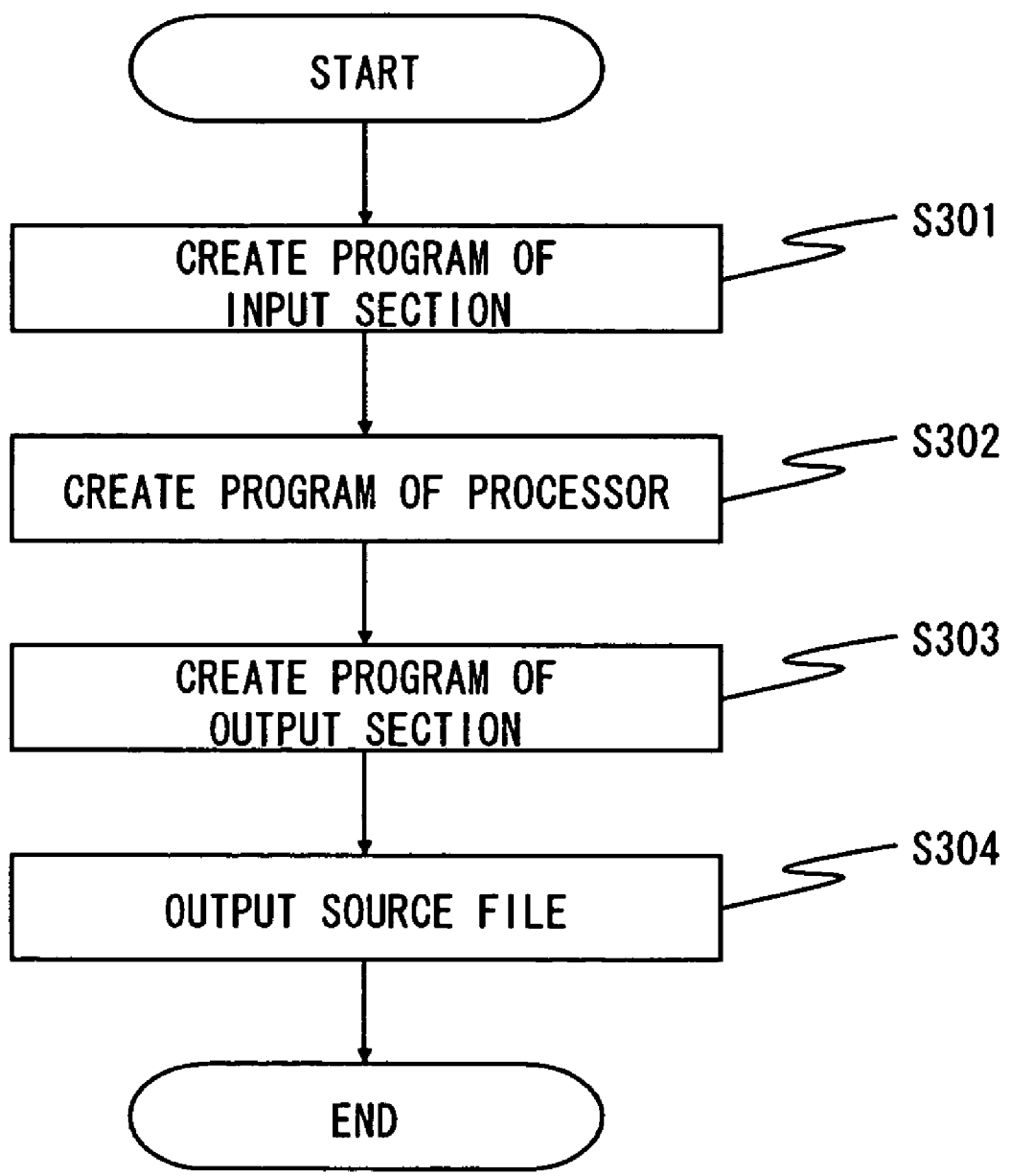
FIG. 17 is a flowchart showing the operation of a program creation apparatus according to an embodiment of the invention.

Referring finally to the flowchart of FIG. 17, the source file creation process performed in S105 of FIG. 10 is described below. The source file creation is implemented by the location file compiler 113.

The location file compiler 113 retrieves the compilation table from the compilation table storage 123 and creates a source file as shown in FIG. 13 based on the retrieved compilation table in Steps S301 to S303. In the creation of the source file, macro instructions are described based on each table. At this time, necessary macro information (macro definition) is retrieved from the macro information storage 124 for the description.

When creating the source file, the location file compiler 113 first creates a program for the input section of the microcomputer (S301). For example, the location file compiler 113 creates the source file of the input section of the microcomputer by referring to the input panel function table. At this time, one row of instructions is created for each row data set of the input panel function table. Setting the panel number as a variable, the result of the macro with a parameter is assigned to the variable. For example, the panel number "I_1", the macro name "SW" and the parameter "H, P4.0" in the input panel function table of FIG. 15A are described as "I_1=SW_H(P4.0)".

Then, the location file compiler 113 creates a program for the processing section of the microcomputer (S302). For example, the location file compiler 113 creates the source file of the processing section of the microcomputer by referring to the processing panel function table and the wiring table. Since no macro parameter is stored in the processing panel function table in the compilation table creation shown in FIG. 14, the parameter of the macro is determined by searching the wiring table. The wiring table is searched in the direction from the present macro toward the microcomputer input section. Specifically, the process repeatedly refers to the panel on the input side and, if the referred panel is the microcomputer input section of the other processing, sets it as the parameter of the present macro. After the parameter is determined, the description is performed so that the macro result is assigned to the variable of the panel number for each row data set of the processing panel function table as in S301.

The case of the AND macro of F_12 in the processing panel function table in FIG. 15B, for example, is as follows. Referring to the array data of the wiring table that corresponds to F_12 in FIG. 16, the upper panel number is "11" and the left panel number is "02". Referring then to the upper side panel F_11 as indicated by the arrow 61, the left panel number of F_11 is "01". Referring to F_01, the upper panel number and the left panel number of F_01 are "−1". Thus, I_1 of the input section that is input to F_01 serves as one input of F_12. Referring further to F_02 on the left side of F_12 as indicated by the arrow 62, the upper panel number and the left panel number of F_02 are "−1". Thus, I_2 of the input section that is input to F_02 serves as the other input of F_12. Consequently, the parameter of the AND macro of F_12 is determined as I_1 and I_2. Then, the index "1", the panel number "F_12" and the macro name "AND" of the processing panel function table are described, together with the determined parameter "I_1, I_2", as "F_12=AND(I_1, I_2).

On the other hand, the case of the OR macro of F_23 in the processing panel function table in FIG. 15B is as follows. Referring to the array data of the wiring table that corresponds to F_23 in FIG. 16, the upper panel number is "22" and the left panel number is "13". Referring then to the upper side panel F_22 as indicated by the arrow 63, the left panel number of F_22 is "12". Referring to F_12, the function index of F_12 is "1". Thus, F_12 serves as one input of F_23. Referring further to F_13 on the left side of F_13 as indicated by the arrow 64, the left panel number of F_23 are "03". Referring to F_03, the upper panel number and the left panel number of F_03 are "−1". Thus, I_3 of the input section that is input to F_03 serves as the other input of F_23. Consequently, the parameter of the OR macro of F_23 is determined as F_12 and I_3. Then, the index "2", the panel number "F_23" and the macro name "OR" of the processing panel function table are described, together with the determined parameter "F_12, I_3", as "F_23=OR(F_12, I_3).

After that, the location file compiler 113 creates a program for the output section of the microcomputer (S303). The location file compiler 113 creates the source file of the output section of the microcomputer by referring to the output panel function table and the wiring table, for example. At this time, as in S302, the parameter of the macro of the output panel function table is determined by searching the wiring table, and the instruction is described for each row data set of the output panel function table.

The case of the LAMP macro of O_3 in the output panel function table in FIG. 15C, for example, is as follows. Referring to F_93 that corresponds to the panel output to O_3 in FIG. 16, the left panel number of F_93 is "83". Then as indicated by the arrow 65, the left panel number of F_83 is "73". The process then repeatedly refers to the panel in this manner, which results in that the function index of F_23 is "2". Thus, F_23 serves as an input to O_3. Consequently, the parameter of the LAMP macro of O_3 is determined as F_23. Then, the panel number of the output panel function table "O_3", the macro name "LAMP" and the parameter "H, P4.3" of the output panel function table are described, together with the determined parameter "F_23", as "LAMP_H(IP4.3, F_23).

Then, the location file compiler 113 outputs the created source file (S304). For example, the location file compiler 113 stores the source file that is created in Steps S301 to S303 in the source file storage 125.

As described in the foregoing, this embodiment allows a user to manipulate GUI to input the operation of a microcomputer and automatically creates a program for the microcomputer according to the GUI. The GUI is represented as icons that indicate widely-known devices of microcomputer peripheral circuit such as wiring, logical circuit and flip-flop, so that the user can easily understand each operation. Further, this invention enables the creation of the program for the operation from the input to output on the microcomputer by simply combining the icons like a puzzle. This allows users without knowledge of software, such as engineers before learning program language or students to create a program easily.

Furthermore, since this embodiment automatically creates a program according to the GUI, it prevents human errors, thus reducing the man-hour for debugging and improving the quality of the program.

In addition, this embodiment creates a program based on the location file that indicates the position of the icons arranged on the editing panel. By creating a wiring table that indicates the connection of the icons, it is possible to create the program that contains necessary instructions only by eliminating unnecessary wiring information from the location file.

It is apparent that the present invention is not limited to the above embodiment that may be modified and changed without departing from the scope and spirit of the invention.

What is claimed is:

1. A program creation apparatus for creating a program for a microcomputer including an input section inputting an input signal, a processor implementing prescribed processing on the input signal, and an output section outputting a result of the processing, the apparatus comprising:

a graphical user interface (GUI) display section displaying a plurality of GUI components, each corresponding to each operation of the input section, the processor and the output section; and a program creator creating the program according to manipulation of the plurality of GUI components by a user; and wherein the GUI display section displays a plurality of editing areas arranged in a matrix;

each of the plurality of GUI components are disposed in any one of the plurality of editing areas by a user;

a position information creator creating position information of the plurality of GUI components disposed on the editing area; and the program creator creates the program according to the created position information of the plurality of GUI components disposed on the editing area by the user.

2. The program creation apparatus according to claim 1, further comprising:
an instruction block storage storing an instruction block containing description of prescribed processing described according to a plurality of instructions for each of the plurality of GUI components,
wherein the program creator creates the program by using the instruction block corresponding to each of the plurality of GUI components disposed on the editing area.

3. The program creation apparatus according to claim 1, wherein the program creator comprises a compiler that converts the created position information into connection information indicating connection of the plurality of GUI components and converts the GUI components and input information of the GUI components determined by the connection information into the program.

4. The program creation apparatus according to claim 3, wherein
the connection information indicates connection on an input side of each of the plurality of GUI components, and
the compiler repeatedly refers to the GUI components connected to the input side of the GUI components according to the connection information and determines input information of the GUI components.

5. The program creation apparatus according to claim 1, further comprising:
an assembler assembling the created program into a machine language program executable on the microcomputer.

6. The program creation apparatus according to claim 5, further comprising:
a writing section writing the assembled machine language program to the microcomputer.

7. A program creation method of creating a program for a microcomputer including an input section for inputting an input signal, a processor for implementing prescribed processing on the input signal, and an output section for outputting a result of the processing, the method comprising:
displaying a plurality of GUI components, each corresponding to each operation of the input section, the processor and the output section; and
creating the program according to manipulation of the plurality of GUI components by a user; and
wherein said displaying displays a plurality of editing areas arranged in a matrix;
each of the plurality of GUI components are disposed in any one of the plurality of editing areas by a user; and
said creating the program comprises creating position information of the plurality of GUI components disposed on the editing area and said creating the program creates the program according to the created position information of the plurality of GUI components disposed on the editing area by the user.

8. The program creation method according to claim 7, further comprising:
storing an instruction block containing description of prescribed processing described according to a plurality of instructions for each of the plurality of GUI components,
wherein the creating of the program creates the program by using the instruction block corresponding to each of the plurality of GUI components disposed on the editing area.

9. The program creation method according to claim 7, wherein the creating the program further comprises converting the created position information into connection information indicating connection of the plurality of GUI components, and converting the GUI components and input information of the GUI components determined by the connection information into the program.

10. The program creation method according to claim 9, wherein
the connection information indicates connection on an input side of each of the plurality of GUI components, and
the converting into the program repeatedly refers to the GUI components connected to the input side of the GUI components according to the connection information and determines input information of the GUI components.

11. The program creation method according to claim 7, further comprising:
assembling the created program into a machine language program executable on the microcomputer.

12. The program creation method according to claim 11, further comprising:
writing the assembled machine language program to the microcomputer.

13. A computer program product, in a computer readable medium, including instructions executed by a computer causing the computer to implement a program creation process of creating a program for a microcomputer including an input section inputting an input signal, a processor implementing prescribed processing on the input signal, and an output section outputting a result of the processing, the process comprising:
displaying a plurality of GUI components, each corresponding to each operation of the input section, the processor and the output section; and
creating the program according to manipulation of the plurality of GUI components by a user; and
wherein said displaying displays a plurality of editing areas arranged in a matrix;
each of the plurality of GUI components are disposed in any one of the plurality of editing areas by a user; and
said creating the program comprises creating position information of the plurality of GUI components disposed on the editing area and said creating the program creates the program according to the created position information of the plurality of GUI components disposed on the editing area by the user.

* * * * *